United States Patent Office 3,163,674
Patented Dec. 29, 1964

3,163,674
PROCESS FOR PRODUCING SUBSTITUTED NORBORNYL UREAS
George A. Buntin, Wilmington, Del., assignor to Hercules Powder Company, Wilmington, Del., a corporation of Delaware
No Drawing. Filed Mar. 7, 1963, Ser. No. 263,402
6 Claims. (Cl. 260—553)

This invention relates to the preparation of substituted norbornyl ureas and more particularly to their preparation from the corresponding thioureas.

In copending application Serial No. 196,866, filed May 23, 1962, by William R. Diveley and Melvin M. Pombo, there is described the preparation of norbornyl ureas from norbornylenes by a series of reactions involving addition of HSCN to norbornene, conversion of the norbornyl isothiocyanate produced by reaction with a dialkyl amine to norbornyl thioureas, and conversion of the norbornyl thioureas to the ureas by reaction with chlorine and water. In these reactions the norbornyl radical may be a substituted norbornyl radical.

In accordance with the present invention it has now been found that these, and related substituted norbornyl urea compounds, represented by the formula

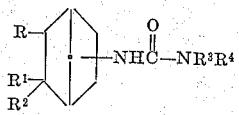

in which R, $R^1$ and $R^2$ when taken as individual radicals are selected from the group of hydrogen, chlorine, bromine, alkyl having up to 4 carbon atoms and chloromethyl and when taken as a group $R^2$ is hydrogen and R and $R^1$ taken together represents a divalent union of the group —$(CH_2CH_2CH_2)_n$—, where $n$ is an integer not exceeding 1, —$CH_2CH=CH$—, and —$CH_2CHCl$—$CHCl$— and $R^3$ and $R^4$ are selected from the group of alkyl radicals having 1–8 carbon atoms, are prepared by a process which comprises preparing a thiourea compound of the formula

and reacting said thiourea compound with phosgene in a water-free organic solvent and hydrolyzing the resulting product with an acid acceptor in an aqueous medium and recovering said urea compound therefrom.

Urea compounds of the above general formula are readily prepared by the process of this invention by the following series of reactions:

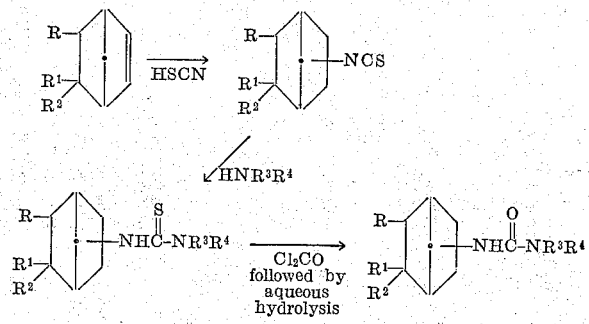

The reaction with HSCN is effected by contacting the unsaturated norbornene compound with HSCN generated in situ from a salt of thiocyanic acid and a mineral acid in aqueous media, at ordinary temperatures below 150° C.

The reaction of the resultant isothiocyanate compound with a dialkyl amine, $HNR^3R^4$, also takes place on contacting the two reagents at ordinary temperatures below 150° C.

The reaction of the thiourea with phosgene requires one mole of phosgene and the hydrolysis requires one mole of water and an equivalent of acid acceptor per mole of thiourea whereby carbonyl sulfide and the salt of the acid acceptor are produced as by-products.

The process of this invention is more particularly illustrated by the following examples where parts and percentages are by weight.

EXAMPLE 1

*5-chloro-5-methylnorbornene.*—Two hundred parts of 2-chloro-1-propene, 1 part of hydroquinone, and 120 parts of dicyclopentadiene were mixed and sealed in three Carius tubes. The tubes were heated at 200° C. for 15 hours. The tubes were then cooled and opened. The contents were washed out with benzene and the resulting solution distilled at reduced pressure. A fraction of 80.8 parts of yellow liquid was collected at 80–130° C. at 25 mm. pressure. It analyzed 25.3% Cl compared to a calculated value of 24.9% Cl.

*5 - chloro - 5 - methylnorbornylisothiocyanate.*—To 70 parts of the above 5-chloro-5-methylnorbornene and 75 parts of KSCN in 180 parts of benzene with stirring at 40° C. was added dropwise a solution of 59 parts of concentrated $H_2SO_4$ in 17 parts of water. The mixture was stirred for 6 hours at 30–35° C. and then allowed to stand overnight. The mixture was filtered. The cake was washed with benzene. The filtrate and washings were combined and washed with water and dried over $Na_2SO_4$. The benzene was distilled off at reduced pressure. The unreacted norbornene was distilled off at 50 to 85° C. at 1 mm. (44 parts) leaving a residue of 25.5 parts of viscous yellow liquid which was taken as isothiocyanate.

*1-(5-chloro-5-methyl norbornyl) - 3,3 - dimethylthiourea.*—To 25.5 parts of the above isothiocyanate in 60 parts of hexane (filtered to remove a small amount of HSCN polymer) was added dimethylamine gas at 5–15° C. to saturate the solution. The precipitate that formed was filtered out, washed with hexane, and dried. There was obtained 19.3 parts of soft, tan solid, M.P. 65–67° C.

*1 - (5 - chloro-5 - methylnorbornyl) - 3,3 - dimethylurea.*—To a solution of 40 parts of phosgene in 200 parts of tetrahydrofuran at 0° C. was added 83.5 parts of the above thiourea with stirring over a one hour period. The temperature rose to 30° C. and a solid separated. To this suspension was added gradually 32 parts NaOH in 125 parts water at 40–45° C. After standing for about 3 hours, crystals separted. These were filtered out, washed with water, and recrystallized from benzene–hexane mixture. Forty-two parts of 1-(5-chloro-5-methylnorbornyl)-3,3-dimethylurea which was a white solid, M.P. 164–165° C. was obtained.

EXAMPLE 2

*5 - chloro - 5-chloromethylnorbornene.*—Two hundred eighty parts of 2,3-dichloropropene-1 and 152 parts of dicyclopentadiene were mixed and sealed in Carius tubes. The tubes were heated at 200° C. for 15 hours. They were opened and the contents removed and distilled at reduced pressure. A fraction of 178.2 parts of water white liquid was collected boiling at 105–128° C. at 20 mm. pressure.

*5 - chloro - 5 - chloromethylnorbornylisothiocyanate.*— One hundred fifty parts of 5-chloro-5-chloromethylnorbornene prepared as above was reacted with 105 parts of KSCN and 85 parts of 98% H$_2$SO$_4$ in 24 parts of water and 240 parts of benzene. There remained 43.4 parts of viscous yellow liquid product after distilling off the unreacted norbornene up to a pot temperature of 80° C. at 0.8 mm. pressure.

*1 - (5 - chloro - 5 - chloromethylnorbornyl) - 3,3 - dimethylthiourea.*—Thirty-six parts of the isothiocyanate in 50 parts of benzene was saturated with dimethylamine gas at 10–20° C. The benzene was distilled off at reduced pressure, leaving 38.3 parts of viscous red liquid which cooled to a solid crystalline mass. It analyzed 10.8% S and 22.3% Cl (calculated values are 11.3% S and 25.0% Cl). Thirty parts of this crude thiourea was crystallized from methanol to give 12.8 parts of white crystalline solid, M.P. 138–140° C. It analyzed 24.9% Cl and 9.85% N compared to the calculated values of 25.0% Cl and 9.9% N.

*1 - (5 - chloro - 5 - chloromethylnorbornyl) - 3,3 - dimethylurea.*—To a solution of 40 parts of phosgene in 200 parts tetrahydrofuran at 0° C. was added 95 parts of the 1 - (5-chloro-5-chloromethylnorbornyl)-3,3-dimethylthiourea with stirring over a one hour period. The resulting suspension was neutralized with 125 parts of 20% sodium hydroxide added gradually at 40° C. Fifty-five parts of white crystalline solid urea, M.P. 208–210° C. were obtained.

EXAMPLE 3

Vinyl chloride was reacted by heating at 200° C. for 15 hours with cyclopentadiene and the resulting chloronorbornylene was reacted with HSCN and the resulting chloronorbornyl isothiocyanate was reacted with dimethylamine to produce 1-(chloro-2-norbornyl)-3,3-dimethyl-2-thiourea, M.P. 95–100° C.

To twenty parts 1-(chloro-2-norbornyl)-3,3-dimethyl-2-thiourea suspended in 250 parts of toluene at 30° C. was added 15 parts phosgene while stirring. The reaction mixture was maintained at less than 35° C. by cooling for 3 hours and then at 40° C. for one hour. No solids separted. This solution was neutralized with 200 parts 10% sodium hydroxide which was added gradually at 25–30°C. The product was then isolated by evaporating the toluene and it was crystallized from a mixture of chloroform and hexane to obtain 15.9 parts of 1-(chloro-2-norbornyl)-3,3-dimethyl-2-urea which melted at 195–197° C.

EXAMPLE 4

1 - (5,6 - dehydronorbornyl) - 3,3 - dimethyl - 2 - thiourea, M.P. 101–104° C., was prepared by reacting 5,6-dehydronorbornyl isothiocyanate with dimethylamine. To 40 parts of phospgene in 200 parts tetrahydrofuran at 0° C. there was slowly added 71.5 parts of this 1-(5,6-dehydronorbornyl)-3,3-dimethyl-2-thiourea over a 45-minute period while stirring. After 3 hours continued stirring as the temperature was raised to 25° C., a solution of 32 parts NaOH in 125 parts water was added gradually at 40–45° C. to the resulting slurry and then sufficient more NaOH was added to basicity. During this latter reaction the slurry reacted and the new product formed a slurry. The solids were removed by filtration, washed and dried. The dry product which still contained small amounts of sulfur melted at 180–182° C. The yield was 42 parts of 1-(5,6-dehydronorbornyl)-3,3-dimethyl-2-urea.

EXAMPLE 5

To a solution of 15 parts phosgene in 100 parts tetrahydrofuran at 0–3° C. was added 25 parts of finely divided 1 - dihydrodicyclopentadienyl - 3,3-dimethyl-2-thiourea, M.P. 100–101° C., over a one hour period while stirring. The reaction mixture was then allowed to warm up to about 25° C. during which time some gas was evolved and a white solid separated. To this resulting slurry 12 parts NaOH in 100 parts water was added dropwise with stirring at 40–45° C. and stirring was continued for one hour. The organic layer contained the desired product. This layer was separated and dried and the solvent evaporated. The product thus obtained was 1-dihydrodicyclopentadienyl-3,3 - dimethyl-2 - urea which was a white powder, M.P. 149–153°C., amounting to 20.7 parts. Analysis showed a trace of sulfur which was readily removed by recrystallization.

1-tetrahydrodicyclopentadienyl - 3,3-dimethyl - 2-urea was produced by hydrogenation of 1-dihydrodicyclopentadienyl-3,3-dimethyl-2-urea (recrystallized from toluene) in a toluene solution with Raney nickel catalyst at 500 p.s.i.g. hydrogen pressure at 100° C. The 1-tetrahydrodicyclopentadienyl-3-3-dimethyl-2-urea so obtained was crystallized from toluene. It melted at 170–1° C.

The reaction of the thiourea with phosgene is carried out in accordance with this invention at a temperature in the range of about 0° C. to about 80° C. and preferably in the range of about 0° C. to about 50° C. in an organic solvent which is water free. Suitable solvents are benzene, xylene, toluene, chloroform, carbon tetrachloride, ethylene chloride, methylene chloride, dihydropyran, tetrahydrofuran, diisopropyl ether, dioxane, diethyl ether, hexane, and similar hydrocarbons, halogenated hydrocarbons and ethers. The solvent need not dissolve the thiourea but may be used as a suspending medium. The solvent should be water-free.

The hydrolysis of the intermediate product formed by the reaction of the thiourea and phosgene is carried out at a temperature in the range of about 0° C. to about 100° C. and preferably 10° C. to 60° C. in an aqueous medium. The alkali used in the examples illustrates the use of an acid acceptor which broadly may be any of the alkaline salts, particularly carbonates, hydroxides, and oxides of the alkali and alkaline earth metals. Sodium hydroxide is preferred, but sodium carbonate, lime, magnesium oxide and similar acid acceptors may be used.

While the process of this invention is applicable to the conversion of the substituted organic thioureas regardless of their source to the corresponding ureas, it is particularly applicable as a preparative method where the thiourea is prepared by way of the addition of thiocyanic acid to an unsaturated compound whereby substituted organic thioureas of the general formula

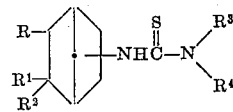

are produced as an intermediate. The process of this invention is particularly advantageous for conversion of unsaturated thioureas to unsaturated ureas as in the process of Example 5 where 1-dihydrodicyclopentadienyl-3,3-dimethyl-2-thiourea is converted to 1-dihydrodicyclopentadienyl-3,3-dimethyl-2-urea since phosgene does not add to or affect the double bond in the ring.

What I claim and desire to protect by Letters Patent is:

1. The method of preparing a urea compound of the formula

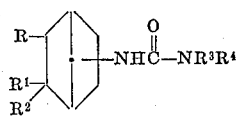

in which R, R$^1$, and R$^2$, when taken as individual radicals, are selected from the group consisting of hydrogen, chlorine, bromine, alkyl radicals having 1 to 4 carbon atoms and chloromethyl, and when taken as a group, R$^2$ is hydrogen, and R and R$^1$ taken together represent a divalent union of the group consisting of a chemical bond and —CH$_2$CH=CH—, and CH$_2$CHCl—CHCl—, and R$^3$ and R$^4$ are selected from the group consisting of alkyl radicals having 1 to 8 carbon atoms, which comprises reacting a thiourea compound of the formula

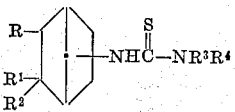

stepwise first with phosgene in a water-free organic solvent at a temperature in the range of 0 to 80° C. and then reacting the product of the first reaction with water in aqueous medium at a temperature in the range of 0° C. to 100° C. in the presence of an acid acceptor.

2. The method of claim 1 in which the compounds are those in which R and $R^1$ taken together represent a chemical bond, $R^2$ is hydrogen, and $R^3$ and $R^4$ are methyl radicals.

3. The method of claim 1 in which the compounds are those in which $R^2$ is hydrogen, R and $R^1$ taken together represent —$CH_2CH=CH$—, and $R^3$ and $R^4$ are methyl radicals.

4. The method of claim 1 in which the compounds are those in which R is chlorine, $R^1$ and $R^2$ are hydrogen, and $R^3$ and $R^4$ are methyl radicals.

5. The method of claim 1 in which the compounds are those in which R, $R^1$ and $R^2$ are hydrogen, and $R^3$ and $R^4$ are methyl radicals.

6. The method of preparing 1-tetrahydrodicyclopentadienyl-3,3-dimethyl-2-urea which comprises the steps of (1) reacting 1-dihydrodicyclopentadienyl-3,3-dimethyl-2-thiourea with an equimolecular amount of phosgene, (2) reacting the reaction mixture of step (1) with water and recovering as a product 1-dihydrodicyclopentadienyl-3,3-dimethyl-2-urea, and (3) reacting the 1 - dihydrodicyclopentadienyl - 3,3-dimethyl - 2-urea with one mole of hydrogen whereby 1-tetrahydrodicyclopentadienyl-3,3-dimethyl-2-urea is produced.

No references cited.